2,913,418

TAR REMOVER

Louis C. Sohngen, Hamilton, and Jack J. Bulloff, Dayton, Ohio, assignors to The Las-Stik Mfg. Co., Hamilton, Ohio No Drawing. Application May 2, 1956
Serial No. 582,065

1 Claim. (Cl. 252—163)

This invention relates to new compositions of matter adapted for use as tar removers.

It is desirable, in removing tar from a painted surface, to effect such removal with minimum damage to the paint. Also, it is desirable to mark off the area treated with the remover as a guide for re-waxing or re-touching the same. This is particularly important in garages where tar is being removed from a large number of automobiles and where the lighting may be such that the areas to be re-waxed cannot be detected readily.

In the big garages and finishing shops, the operators usually wipe off the dried tar remover with a cloth held in one hand and apply the wax to the treated area with a cloth held in the other hand. For speed and efficiency, as well as for conserving both the tar remover and the wax, it is desirable that the area to be worked on be plainly discernible to the eye.

Another requirement for a wholly satisfactory tar remover is that it should have a viscosity such that it does not run off onto untarred areas particularly when the surface treated is disposed vertically. This conserves the tar remover and also protects adjacent painted surfaces which do not require treatment therewith.

The tar removers that have been known heretofore have been deficient in one or more of the foregoing respects and have failed to satisfy all of the requirements for an ideal tar removing composition.

The primary object of this invention is to provide new compositions that satisfy all of the requirements for an ideal tar remover while removing a minimum of the paint when applied to a painted surface.

Another object is to provide new compositions for effectively removing tar from automobile bodies and the like, which compositions leave a minimum oil film on the treated surface after wiping of the dissolved tar therefrom.

A further object is to provide new tar removing compositions containing a marking agent.

An added object is to provide new and improved tar removing compositions which are commercially competitive with the less effective and less satisfactory tar removers of the prior art.

These and other objects are accomplished by providing compositions which comprise a solvent for the tar, e.g., a coal tar or petroleum solvent such as gasoline, benzene, kerosene, Sohio solvent, etc., a finely divided pigment, finely divided silica, or a mixture of finely divided pigment and silica. The pigment and/or silica are used in the form of particles having a diameter of 0.1 millimicron to 20 microns. Preferably, the pigment particles have a diameter of 5 millimicrons to 15 microns, and the silica particles have a diameter of 0.5 millimicron to 10 microns.

Although the tar remover may consist of the tar solvent and a finely divided pigment, it is found that while the pigments are strong marking agents they are relatively poor thickening and suspending agents. The compositions consisting of the solvent and pigment may not have the desired viscosity.

On the other hand, the finely divided silica is an excellent thickening agent but has relatively poor marking property. Compositions consisting of the solvent and finely divided silica may not have the desired marking characteristics.

In the preferred embodiment of this invention, the tar remover comprises the tar solvent containing both the finely divided pigment and the finely divided silica. It is found that when both the pigment and the silica are present in the solvent in the ratio of 2:1 to 5:1, the two materials act upon each other cynergistically, with the unexpected very advantageous result that the silica maintains the pigment in suspension in the solvent without stratification, thus eliminating any problem of caking of the pigment at the bottom of the container and concentration of the solvent at the top thereof.

By having the marker (pigment) and silica evenly distributed through the solvent, the silica assists distribution of the solvent in the tar, the action on the tar is uniform and the area treated is clearly delineated so that the operator can quickly and accurately re-wax the same.

The compositions have the additional advantage that when wiped off (removing the tar) and dried, they leave a bright surface which requires less rubbing after application of the wax to take on a high sheen.

The solvent used may be predominantly aromatic or predominantly aliphatic. Mixtures of the predominantly aromatic and predominantly aliphatic solvents in any proportions may be used. The choice of solvent will depend on the temperature conditions. In cold weather, predominantly aromatic petroleum solvents are preferred; in warmer weather the predominantly aliphatic, less expensive coal tar solvents are satisfactory.

Finely divided pigments including white pigments, white pigment extenders, and coloring pigments may be used.

The silica may have an average particle size in the range stated above, but in general colloidal silica is preferred.

The following examples are given to illustrate one preferred embodiment of the invention, it being understood that the examples are not intended as limitative.

Example 1

One hundred and fifty gallons of tar remover were prepared from the following materials:

96% Solvesso 100 (a predominantly aromatic petroleum solvent marketed by Standard Oil Company of Ohio)
3% ASP 600 (a finely divided white absorbent Attapulgis clay marketed by Minerals & Chemicals Co. of America-Edgar Div.)
1% Cab-O-Sil (colloidal silica marketed by Godfrey L. Cabot Company)

One-fourth of the total Solvesso 100 was introduced into a mixing tank equipped with stirrers. The stirrers were set in action and the ASP 600 (33 pounds) was added in increments of 1–2 pounds, at ten second intervals, and with mixing after each addition. The Cab-O-Sil (11 pounds) was added over a period of 2 minutes and the remaining Solvesso 100 was then blended in.

For best results, the mixing is performed in a vessel equipped with a stirrer that exerts a high shear in the mixing, since the higher the initial shear of mixing the less the tendency of the dispersed particles to settle.

The compositions are applied liberally with a cloth to the tarred area, rubbed in, allowed to soak into the tar, and then rubbed off, removing the tar. The area is allowed to dry, wiped with a clean cloth, and is then ready for waxing.

Example II

Example I was repeated using, as the solvent, a mixture of 80% Solvesso 100 and 16% of Sohio solvent, the latter being a petroleum naphtha cut marketed by Standard Oil Company of Ohio.

Example III

Example I was repeated using, as the solvent, a mixture of 61% Solvesso 100 and 35% Sohio solvent.

Example IV

Example I was repeated using, as the solvent, 42% Solvesso 100 and 54% Sohio solvent.

Example V

Example I was repeated, using as the solvent, 23% Solvesso 100 and 73% Sohio solvent.

Example VI

Example I was repeated using Sohio solvent.

The composition of Example II is useful over a wide temperature range including freezing temperature. The compositions of Examples III–VI are useful at higher temperatures.

Example VII

Compositions (a–h) as in Example I were prepared using, as the solvent, the solvents listed below in amounts by weight equal to the amount shown in Example I.

(a) Sohio High Flash VM & P naphtha (Standard Oil Co. of Ohio)
(b) Sohio Varnolene (VMP naphtha solvent; Standard Oil Co. of Ohio)
(c) Solvesso 150
(d) 1:1 Shell Sol 72—Solvesso 100 (Shell Development Co. petroleum solvent)
(e) 1:1 Stoddard Solvent—Solvesso 150
(f) Chemical Solvent's Varno Solvent (VMP naphtha; Chemical Solvent Co.)
(g) Hi-Solv 534 (high aromatic petroleum solvent)
(h) 1:1 kerosene-Solvesso 100

Example VIII

Compositions (a–n) were prepared as in Example I except that the 4% solids used were as listed below:

(a) 0.8% "Cab-O-Sil" and 2.2% ASP 600
(b) 0.7% "Cab-O-Sil" and 3.3% ASP 600
(c) 1.0% "Cab-Sil" and 3% ASP 1300
(d) 1.0% "Cab-O-Sil" and 3% ASP 1100
(e) 1.0% "Cab-O-Sil" and 3% ASP 500
(f) 1.0% "Cab-O-Sil" and 3% ASP 400
(g) 1.0% "Cab-O-Sil" and 3% ASP 200
(h) 1.0% "Cab-O-Sil" and 3% ASP 100
(i) 1.0% "Cab-O-Sil" and 3% Attasorb [1] HVM
(j) 1.0% "Cab-O-Sil" and 3% Attasorb RVM
(k) 1.0% "Cab-O-Sil" and 3% Attaclay [1]
(l) 0.7% "Cab-O-Sil" and 3.3% Colloidal Cermagel [1]
(m) 1.0% "Cab-O-Sil" and 3% Attasol [1]
(n) 1.0% "Cab-O-Sil" and 1.5% Attasorb HVM plus 1.5 ASP 200

[1] Colloidal clays marketed by Minerals and Chemicals Co. of America.

Example IX

Compositions (a–p) were made up as in Example I but having the solids content listed below:

(a) 2% Syloid 244 and 4% ASP 600 (colloidal silica; Davidson Chemical Co.)
(b) 2% Santocel 54 and 4% ASP 600 (colloidal silica: Monsanto Chemical Co.)
(c) 1.4 Dow Corning Silica and 3.8 ASP 600
(d) 3% Columbia silene and 3% ASP 600 (colloidal silica; Columbia Southern Div. Pittsburgh Plate Glass Co.)
(e) 2% Cab-O-Sil and 4% fuller's earth
(f) 2% Cab-O-Sil and 4% bentonite
(g) 12% ASP 600
(h) 12% Attasorb HVM
(i) 10% National Lead Ben-A-Gel (bentonite; National Lead Co.)
(j) 8% Permagel (colloid milled) (National Lead Co.)
(k) 3% Cab-O-Sil
(l) 5% Cab-O-Sil
(m) 3% Johns Manville Mircocel [1] C
(n) 3% Johns Manville Mircocel B
(o) 3% Johns Manville Mircocel A
(p) 5% precipitated chalk

[1] Hydrated calcium silicate.

It will be apparent that the invention provides new tar removing compositions involving the following important features:

(1) Use of pigment to mark the areas of application, wet or dry;
(2) Use of colloidal silica (thickener) to:
   (a) Simplify the canning of the tar remover
   (b) Prevent caking of the suspensoid on setting
   (c) Increase solvent adherence on vertical surfaces
(3) Conjoint use of the finely divided working pigment and silica to:
   (a) Improve the appearance of the product
   (b) Provide a high suspensoid area for sorption of tar from solvent
   (c) Provide a high bulk absorbent residue on drying that removes residual oil from the de-tarred surface on wiping In general, white pigments are used but coloring pigments selected to show on the painted surface of particular color to be treated may be used.

While any effective tar removing composition has a tendency to remove paint as well, the compositions of this invention remove tar accumulations from painted surfaces with minimum damage (dissolving and erosion) to the paint. The compositions are excellent markers in both the wet and dry conditions and have good vertical cling. The suspensions are stable over practical time periods and may be prepared, packaged, and stored under normal conditions without settling or caking of the suspended particles. They tested favorably when checked for rag bleed-out, pour behaviour and appearance.

Since it will be apparent that changes and modifications can be made in the composition specifically exemplified without departing from the spirit and scope of the invention, it is to be understood that it is not intended to limit the invention except as defined in the appended claim.

What is claimed is:

A liquid composition for removing tar from painted surfaces, said composition consisting of the following constituents in the proportionate amounts by weight, gasoline 96%, finely divided clay marking pigment 3%, colloidal silica 1%, said pigment and colloidal silica having an average particle size of 0.1 millimicron to 20 microns, and the ratio of pigment to colloidal silica being in the range of 2:1 to 5:1.

References Cited in the file of this patent

UNITED STATES PATENTS

| | | |
|---|---|---|
| 1,248,071 | Bule | Nov. 2, 1917 |
| 2,650,202 | Hawes | Aug. 25, 1953 |
| 2,665,259 | Buffet | Jan. 5, 1954 |
| 2,708,157 | Houser | May 10, 1955 |

(Other references on following page)

FOREIGN PATENTS

| | | |
|---|---|---|
| 965,236 | France | Feb. 15, 1950 |
| 825,731 | Germany | Dec. 20, 1951 |

OTHER REFERENCES

"Washing, Cleaning, and Polishing Materials," circular of the Nat. Bur. of Standards (C424), 1939, p. 43.

Hackh's "Chemical Dictionary," 3rd ed., 1944, p. 370.

Lesser in "Soap and Sanitary Chemicals," May 1951, pp. 31–34, 131.

Lesser in "Soap and Sanitary Chemicals," June 1951, pp. 30–33, 98, 157.

"Handbook of Material Trade Names," by Zimmerman and Lavine, 1953, p. 500, pub. by Ind. Research Service.